(12) United States Patent
Whittle et al.

(10) Patent No.: US 11,614,136 B2
(45) Date of Patent: Mar. 28, 2023

(54) WEAR LINER MANUFACTURING SYSTEMS AND METHODS

(71) Applicant: GOODRICH CORPORATION, Charlotte, NC (US)

(72) Inventors: Scott Whittle, Springboro, OH (US); Nathaniel John Herrmann, Springfield, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 496 days.

(21) Appl. No.: 16/742,490

(22) Filed: Jan. 14, 2020

(65) Prior Publication Data

US 2021/0215216 A1  Jul. 15, 2021

(51) Int. Cl.
| | |
|---|---|
| *F16D 65/12* | (2006.01) |
| *F16D 69/02* | (2006.01) |
| *B29C 70/54* | (2006.01) |
| *B32B 5/02* | (2006.01) |
| *B60T 8/32* | (2006.01) |
| *F16D 66/02* | (2006.01) |
| *F16D 69/04* | (2006.01) |

(52) U.S. Cl.
CPC .......... *F16D 69/023* (2013.01); *B29C 70/545* (2013.01); *B32B 5/028* (2013.01); *B60T 8/325* (2013.01); *F16D 65/127* (2013.01); *F16D 66/022* (2013.01); *F16D 69/0408* (2013.01)

(58) Field of Classification Search
CPC .......... B29C 70/545; B32B 5/12; B32B 5/08; F16D 65/123–128; F16D 69/023; F16D 69/0408

USPC .... 188/250 B, 250 G, 251 A, 251 M, 250 C; 156/89.26; 29/411, 412; 428/66.6
See application file for complete search history.

(56) References Cited

U.S. PATENT DOCUMENTS

| | | | | |
|---|---|---|---|---|
| 2,873,517 | A | * | 2/1959 | Wellman ............. F16D 69/0416 419/48 |
| 3,403,759 | A | | 10/1968 | Holcomb, Jr. |
| 3,724,625 | A | | 4/1973 | Rohrlack et al. |
| 3,807,534 | A | | 4/1974 | Eldred |
| 3,917,043 | A | | 11/1975 | Bok |
| 4,955,123 | A | * | 9/1990 | Lawton .................. D04H 18/02 29/411 |
| 5,388,320 | A | * | 2/1995 | Smith ..................... D04H 3/10 28/107 |

(Continued)

FOREIGN PATENT DOCUMENTS

| | | |
|---|---|---|
| DE | 10154334 | 5/2003 |
| EP | 0232059 | 8/1987 |

(Continued)

OTHER PUBLICATIONS

European Patent Office, European Search Report dated Jun. 15, 2021 in Application No. 21150086.3.

*Primary Examiner* — Christopher P Schwartz
(74) *Attorney, Agent, or Firm* — Snell & Wilmer L.L.P.

(57) ABSTRACT

A method of manufacturing a plurality of wear liner segments may comprise selecting a number of wear liner segments for a wear liner assembly. The wear liner assembly may be annular in shape. The number of wear liner segments may selected based on minimizing a waste portion of a textile board and/or maximizing a production capacity of a plurality of the wear liner assembly.

13 Claims, 6 Drawing Sheets

(56) References Cited

U.S. PATENT DOCUMENTS

| | | | |
|---|---|---|---|
| 5,546,880 A * | 8/1996 | Ronyak | B32B 18/00 |
| | | | 188/250 C |
| 5,868,888 A | 2/1999 | Don et al. | |
| 6,691,393 B2 * | 2/2004 | James | D04H 18/02 |
| | | | 29/412 |
| 9,950,452 B1 | 4/2018 | Booher | |
| 10,436,267 B2 * | 10/2019 | Simpson | F16D 65/126 |
| 10,746,246 B2 * | 8/2020 | Fryska | B32B 5/12 |
| 11,215,250 B2 * | 1/2022 | Cividini | C04B 35/83 |
| 2001/0001189 A1 * | 5/2001 | Johnson | F16D 69/023 |
| | | | 188/251 A |
| 2010/0258387 A1 | 10/2010 | Constans | |
| 2016/0017526 A1 * | 1/2016 | Miao | D04H 1/4374 |
| | | | 428/66.6 |
| 2017/0184166 A1 * | 6/2017 | Kirkpatrick | F16D 65/126 |
| 2018/0252284 A1 | 9/2018 | Charles et al. | |
| 2019/0162260 A1 | 5/2019 | Reed et al. | |

FOREIGN PATENT DOCUMENTS

| | | |
|---|---|---|
| EP | 0721835 | 7/1996 |
| EP | 1701056 | 6/2009 |
| FR | 2528138 | 12/1983 |
| GB | 1364743 | 8/1974 |
| GB | 1387926 | 3/1975 |
| WO | 02081942 | 10/2002 |
| WO | 2013085806 | 6/2013 |

* cited by examiner

US 11,614,136 B2

WEAR LINER MANUFACTURING SYSTEMS AND METHODS

FIELD

The present disclosure relates to manufacturing systems and methods of braking systems, and more specifically to manufacturing systems and methods of wear liners for friction disks of aircraft braking systems.

BACKGROUND

Aircraft brake systems typically employ a series of friction disks forced into contact with each other to stop the aircraft. Friction disks splined to a non-rotating wheel axle are interspersed with friction disks splined to the rotating wheel. The friction disks withstand and dissipate the heat generated from contact between one another during braking. Current disk assemblies may comprise replaceable wear liners coupled to a reusable core. The liner may be attached to the core via a flange disposed at either an outer diameter of the liner for rotor assemblies or an inner diameter of the liner for stator assemblies. Having an annular shape, liners may result in excess wasted material during manufacturing and fewer liner volume per manufacturing cycle.

SUMMARY

A textile board is disclosed herein. The textile board may comprise: a plurality of cutouts, each cutout disposed adjacent to an adjacent cutout, each cutout including an arcuate shape having an arc angle, the arc angle being less than or equal to 180 degrees; and a waste portion surrounding the plurality of cutouts.

In various embodiments, each cutout in the plurality of cutouts corresponds to a wear liner segment for use in a multi-disk braking system. Each cutout in the plurality of cutouts may comprise a carbon composite matrix. The textile board may be a cuboid. Each cutout in the plurality of cutouts may be semi-annular in shape. The waste portion may be near minimal.

A method of manufacturing a plurality of wear liner segments is disclosed herein. The method may comprise: defining a plurality of cutouts on a textile board, each cutout comprising an arcuate shape having an arc angle less than or equal to 180 degrees, each cutout being adjacent to an adjacent cutout in the plurality of cutouts; and cutting the plurality of cutouts out of the textile board.

In various embodiments, the arc angle of each cutout is the same. Each cutout in the plurality of cutouts may corresponds to a wear liner segment for a multi-disk brake system. The method may further comprise forming a wear liner assembly from a portion of the plurality of cutouts. 360 degrees divided by a number of wear liner segments to form the wear liner assembly may be equal to the arc angle of the arcuate shape. Each cutout in the plurality of cutouts may be semi-annular in shape. The textile board may comprise a carbon composite matrix.

A method of manufacturing a plurality of wear liner segments is disclosed herein. The method may comprise: arranging a plurality of cutouts on a tray for placement in a furnace, each cutout in the plurality of cutouts including an arcuate shape having an arc angle less than or equal to 180 degrees; and placing the tray in the furnace.

In various embodiments, the arc angle of each wear liner segment is the same. The method may further comprise forming a wear liner assembly from a portion of the plurality of cutouts. 360 degrees divided by a number of wear liner segments to form the wear liner assembly may be equal to the arc angle. Each cutout in the plurality of cutouts may be semi-annular in shape. Each cutout in the plurality of cutouts may comprise a carbon composite matrix. Each cutout in the plurality of cutouts may correspond to a wear liner segment for a multi-disk brake system.

Figure 1:
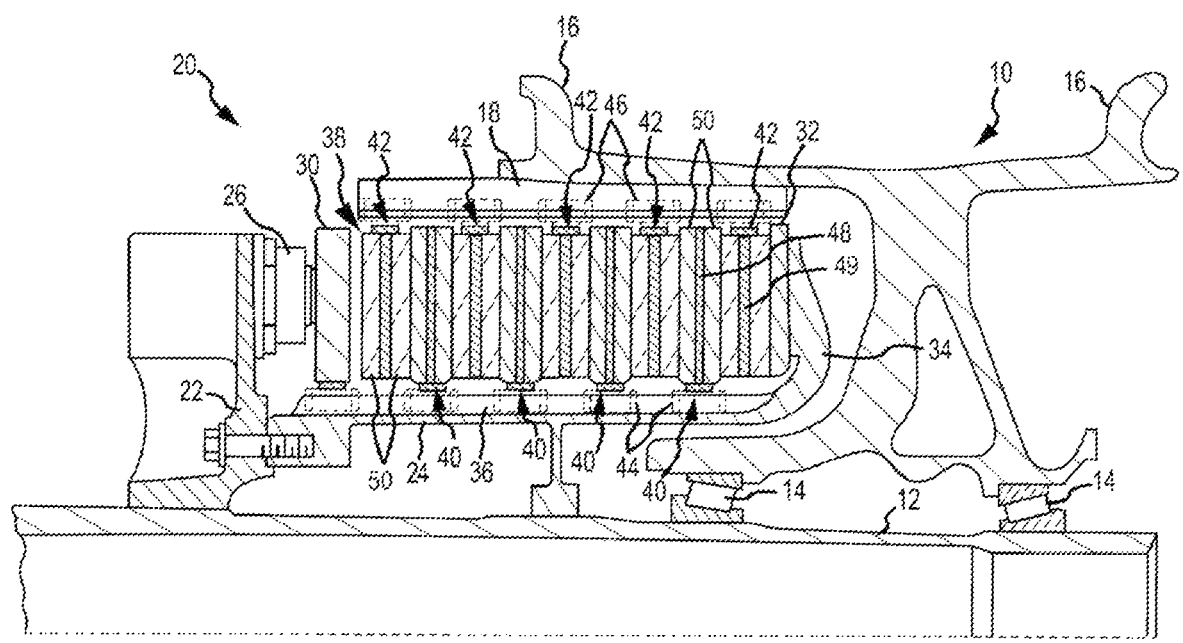
FIG. 1 illustrates a cross-sectional view of a multi-disk brake system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In the case of components that rotate about a common axis, a first component that is "radially outward" of a second component means that the first component is positioned at a greater distance away from the common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

Disclosed herein, according to various embodiments, are wear liner segments for friction disks (e.g., rotors and stators) of a braking system. The friction disks may include a friction disk core with wear liner segments coupled to the friction disk core. As described in greater detail below, the wear liner segments may be manufactured by a process configured to minimize waste material. The wear liners may be manufactured by a process configured to maximize wear liner volume from a single manufacturing cycle. The wear liner segments may be of equal size and arranged to form a wear liner for a friction disk (e.g., rotors and stators) of a braking system.

Referring to FIG. 1, a multi-disk brake system 20 is illustrated according to various embodiments. The system may include a wheel 10 supported for rotation around axle 12 by bearings 14. Axle 12 defines an axis of multi-disk brake system 20 and the various components thereof described herein, and any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk brake system 20. Multi-disk brake system 20 includes torque flange 22, torque tube 24, a plurality of pistons 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIG. 1, or attached as separate components.

Multi-disk brake system 20 also includes a plurality of friction disks 38. Each friction disk 38 may comprise a friction disk core. The plurality of friction disks 38 includes at least one friction disk with a non-rotatable core, also known as a stator 40, and at least one friction disk with a rotatable core, also known as a rotor 42. Stators 40 and rotors 42 may be located adjacent to one another in multi-disk brake system 20, forming a plurality of adjacent stator-rotor pairs. Stators 40 may comprise a stator core 48 and wear liners 50. Rotors 42 may comprise a rotor core 49 and wear liners 50. Each friction disk 38 includes an attachment structure. In the embodiment of FIG. 1, each of the four stators 40 includes a plurality of stator lugs 44 at circumferentially spaced positions around stator 40 as an attachment structure. Similarly, each of the five rotors 42 includes a plurality of rotor lugs 46 at circumferentially spaced positions around rotor 42 as an attachment structure. In the embodiment of FIG. 1, pressure plate 30, end plate 32, and friction disks 38 are all annular structures made at least partially from a carbon composite material.

Torque flange 22 may be mounted to axle 12. Torque tube 24 is bolted to torque flange 22 such that reaction plate 34 is near an axial center of wheel 10. End plate 32 is connected to a surface of reaction plate 34 facing axially inward. Thus, end plate 32 is non-rotatable by virtue of its connection to torque tube 24. Stator splines 36 support pressure plate 30 so that pressure plate 30 is also non-rotatable. Stator splines 36 also support stators 40 via stator cores 48. Stator cores 48 engage stator splines 36 with gaps formed between stator lugs 44. Similarly, rotors 42 engage rotor splines 18 via rotor core 49 with gaps formed between rotor lugs 46. Thus, rotor cores 49 of rotors 42 are rotatable by virtue of their engagement with rotor splines 18 of wheel 10.

As shown in FIG. 1, rotors 42 with rotor cores 49 are arranged with end plate 32 on one end, pressure plate 30 on the other end, and stators 40 with stator cores 48 interleaved so that rotors 42 with rotor cores 49 are directly or indirectly adjacent to non-rotatable friction components. Pistons 26 are connected to torque flange 22 at circumferentially spaced positions around torque flange 22. Pistons 26 face axially toward wheel 10 and contact a side of pressure plate 30 opposite friction disks 38. Pistons 26 may be powered electrically, hydraulically, or pneumatically.

In various embodiments, in response to actuation of pistons 26, a force, towards reaction plate 34, is exerted on the rotatable friction disks 42 and the non-rotatable friction disks 40. The rotatable friction disks 42 and the non-rotatable friction disks 40 may thus be pressed together between pressure plate 30 and end plate 32.

Figure 2:
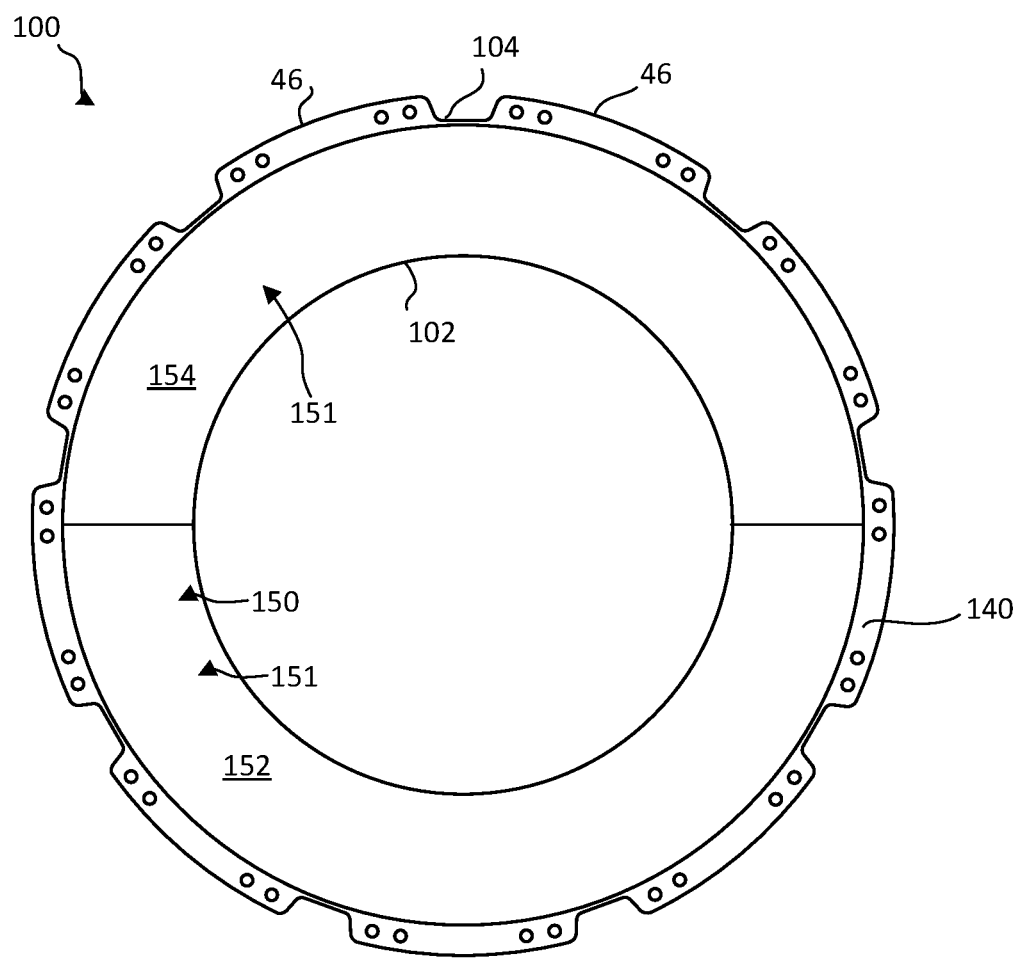
FIG. 2 illustrates a front view of a friction disk having a wear liner assembly, in accordance with various embodiments.

FIG. 2 illustrates a front view of a friction disk 100 having a wear liner assembly 150 disposed on a front surface of a friction disk core 140, according to various embodiments. Friction disk 100 may be a stator or a rotor, such as stator 48 or rotor 49 described above with reference to FIG. 1. In various embodiments, wear liner assembly 150 may be replaceable, such that after wear liner assembly 150 has been worn below a suitable operational thickness, wear liner assembly 150 may be removed from friction disk core 140 and replaced by new or remanufactured wear liners.

In various embodiments, friction disk core 140 and wear liner assembly 150 may comprise different materials. For example, in various embodiments, friction disk core 140 may comprise a first material (e.g., ceramics or steel) and wear liner assembly 150 may comprise a second material such as a carbon composite material. In various embodiments, friction disk core 140 and wear liner assembly 150 may comprise the same material, such as a carbon composite material. In various embodiments, the material of friction disk core 140 may be selected for its structural properties, thermal conductivity, heat capacity, and/or oxidation resistance properties. For example, friction disk core 140 may comprise silicon carbide, tungsten carbide, or titanium. In various embodiments, a material of wear liner assembly 150 may be selected for its wear resistance and/or frictional properties. Thus, friction disk 100 may contain the structural advantages of friction disk core 140 and the frictional advantages of wear liner assembly 150. In various embodiments, friction disk core 140 may be made of ceramics, and wear liner may be made of carbon, reducing oxidation impact to the friction disk.

Friction disk core 140 may comprise a rotor spine and rotor lugs 46. Friction disk core 140 may engage rotor splines 18 (FIG. 1) in rotor gaps formed between rotor lugs 46. Thus, friction disk 100 may be rotatable by virtue of the engagement between rotor lugs 46 of friction disk core 140 and rotor splines 18 of wheel 10 (FIG. 1). Friction disk core 140 may comprise an inner circumferential surface 102 and an outer circumferential surface 104 radially outward of inner circumferential surface 102. Rotor lugs 46 may be extend from outer circumferential surface 104.

In various embodiments, the wear liner assembly 150 comprises a plurality of wear liner segments 151. The number of wear liner segments 151 may be selected based on minimizing waste material during manufacturing of the wear liner segments and/or maximizing a total volume of wear liner assemblies per manufacturing cycle. For example, the plurality of wear liner segments 151 may include 2 to 8 wear liner segments, or 2 to 4 wear liner segments, or 2 to 3 wear liner segments. In various embodiments, each wear liner segment in the plurality of wear liner segments 151 is arcuate in shape. Each wear liner segment in the plurality of wear liner segments 151 may each comprise a substantially equal arc length and/or arc angle. For example, each wear liner segment in the plurality of wear liner segments 151 may be interchanged with another wear liner segment in the plurality of wear liner segments 151 for any wear liner assembly 150.

For example, wear liner assembly 150 may comprise a first wear liner segment 152 and a second wear liner segment 154. The first wear liner segment 152 and the second wear liner segment 154 may be semi-annular in shape (i.e., each having substantially equal arc lengths). In this regard, manufacturing of a plurality of wear liner segments 151 corresponding in shape to the first wear liner segment 152 may produce a plurality of interchangeable wear liner segments to be used in a multi-disk brake system 20 from FIG. 1.

In various embodiments, each wear liner segment in the plurality of wear liner segments 151 may be coupled to an adjacent wear liner segment in the plurality of wear liner segments 151 by any method known in the art. In various embodiments, each wear liner segment in the plurality of wear liner segments 151 may be coupled to friction disk core 140 and/or free from an adjacent wear liner segment in the plurality of wear liner segments 151.

Figure 3:
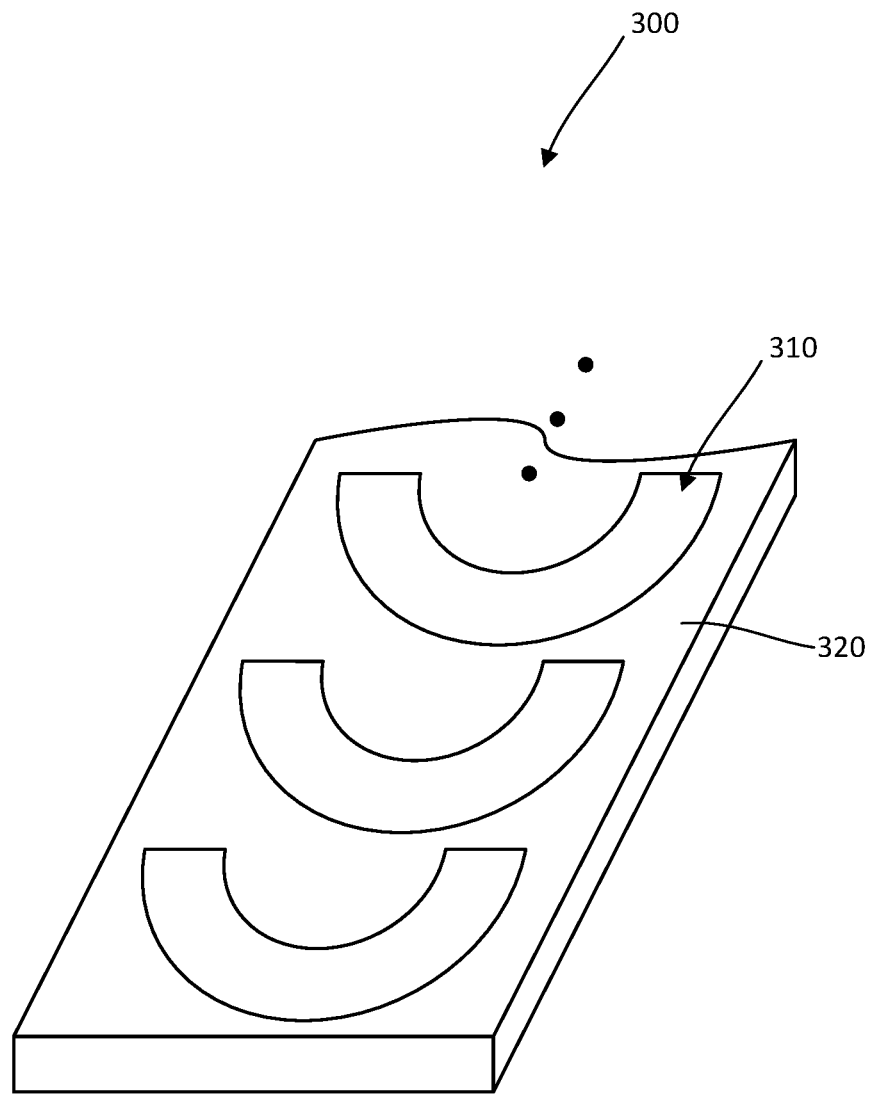
FIG. 3 illustrates a textile board used for manufacturing a plurality of wear liner assemblies, in accordance with various embodiments.

Referring now to FIG. 3, a portion of a textile board 300 during manufacturing of a plurality of wear liner segments is illustrated, in accordance with various embodiments. The textile board 300 may comprise any shape known in the art, such as cubic, or the like. In various embodiments, textile board 300 comprises a plurality of cutouts 310 and a waste portion 320. The plurality of cutouts 310 may be arranged to minimize the volume of the waste portion 320. For example, a plurality of cutouts 310, where each cutout portion in the plurality of cutouts 310 comprises a semi-annular shape, an approximately 37% reduction in waste portion 320 may be achieved compared to annular cutout portions.

In various embodiments, each cutout portion in the plurality of cutouts 310 corresponds to a wear liner segment in the plurality of wear liner segments 151 from FIG. 2. In this regard each cutout portion in the plurality of cutouts 310 may comprise a portion of a wear liner assembly. As such, each cutout portion in the plurality of cutouts 310 may comprise substantially the same arc length and/or substantially the same arc angle. In various embodiments, the arc angle is 360 degrees divided by an integer. For example, the arc angle may comprise 180 degrees (i.e., 360 divided by 2), 120 degrees (i.e., 360 divided by 3), 90 degrees (360 divided by 4), 72 degrees (i.e., 360 divided by 5), etc. In this regard, as the number of cutouts 310 to make a wear liner assembly 150 having an annular shape increases, the greater the reduction in waste portion 320.

In various embodiments, each cutout in the plurality of cutouts 310 may be disposed adjacent to an adjacent cutout in the plurality of cutouts 310. Each cutout in the plurality of cutouts 310 may be determined based on minimizing a volume of the waste portion 320 and/or maximizing a volume of the plurality of cutouts 310.

In various embodiments, the textile board 300 may comprise a carbon composite material or the like. By minimizing the waste portion 320 of the textile board 300, significant cost savings may be realized during manufacturing of wear liner segments (e.g., the plurality of wear liner segments 151 from FIG. 2). Similarly, a utilization rate of the textile board 300 may be maximized by increasing a number of cutouts in the plurality of cutouts 310 that form a wear liner assembly having an annular shape.

Figure 4:
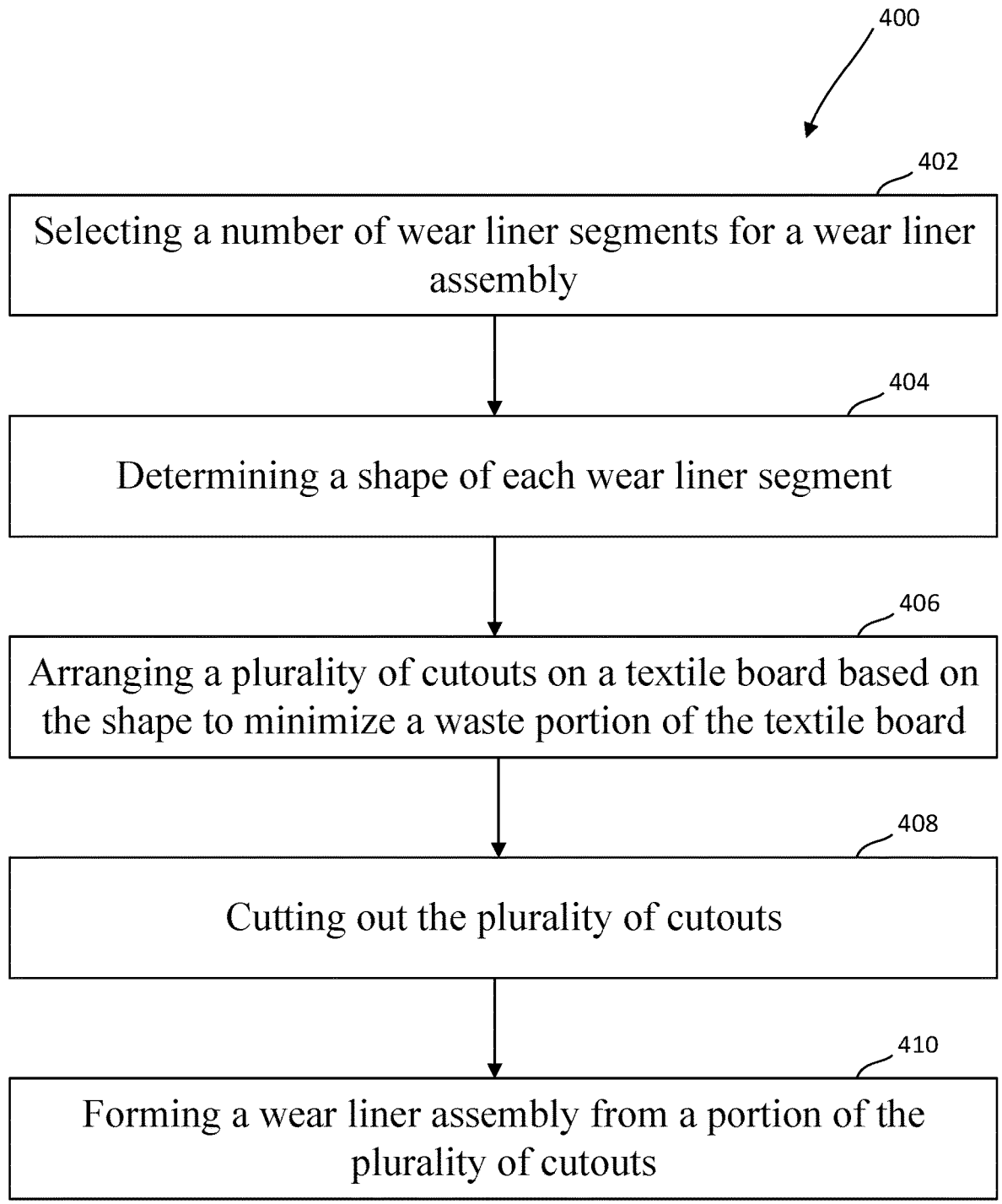
FIG. 4 illustrates a method of manufacturing a plurality of wear liner segments, in accordance with various embodiments.

Referring now to FIG. 4, a method 400 of manufacturing a plurality of wear liner segments is illustrated, in accordance with various embodiments. The method 400 may comprise selecting a number of wear liner segments for a wear liner assembly (step 402). The number of wear liner segments may be determined based on a desired reduction in waste from a textile board used to manufacture the wear liner segments. For example, the number of wear liner segments to form a wear liner assembly having an annular shape may be increased in order to obtain a greater reduction in waste material of the respective textile board.

The method 400 may further comprise determining a shape of each wear liner segment based on the selected number of wear liner segments (step 404). For example, if the desired number of wear liner segments is two, the shape of each wear liner segment may be semi-annular (i.e., two wear liner segments forms an annular wear liner assembly), or if the desired number of wear liner segments is three, the shape of each wear liner segment may be arcuate with an arc angle of approximately 120 degrees (i.e., three wear liner segments forms an annular wear liner assembly).

The method 400 may further comprise arranging a plurality of cutouts on a textile board based on the shape to minimize a waste portion of the textile board (step 406). In this regard, each cutout in the plurality of cutouts corresponds to a wear liner segment in the plurality of wear liner segments. Each cutout in the plurality of cutouts may be disposed adjacent to an adjacent cutout in the plurality of cutouts. The method 400 may further comprise cutting out the plurality of cutouts (step 408). The method 400 may further comprise forming a wear liner assembly from a portion of the plurality of cutouts (step 410). For example, if the selected number of wear liner segments is two, a first cutout in the plurality of cutouts may be coupled to a second cutout in the plurality of cutouts to form a wear liner assembly having an annular shape.

Figure 5:
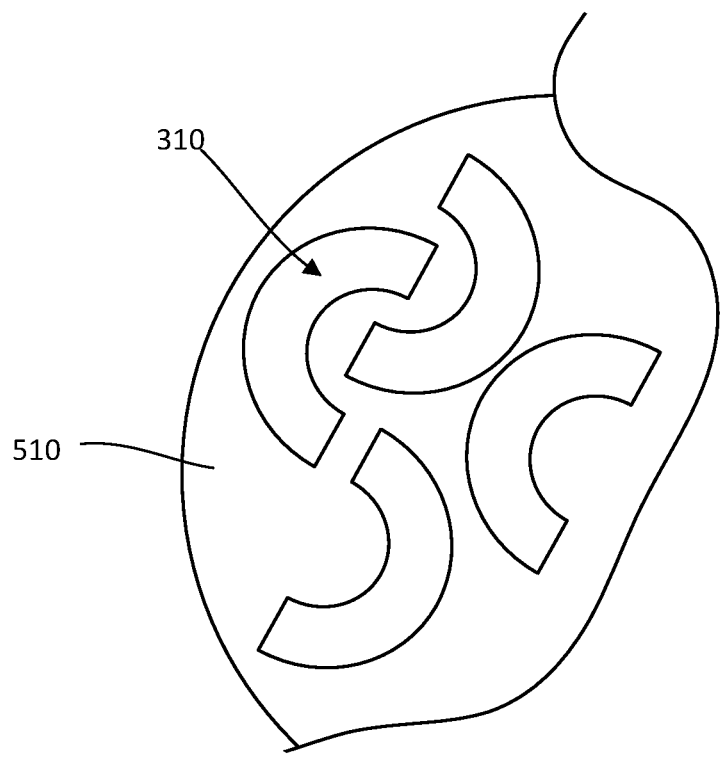
FIG. 5 illustrates an arrangement of cutouts from a textile board on a tray prior to placing the tray in a furnace, in accordance with various embodiments.

Referring now to FIG. 5, a top view of a tray for placement in a furnace is illustrated, in accordance with various embodiments. In various embodiments, the plurality of cutouts 310 from FIG. 3 may be arranged on a tray 510. In various embodiments, the tray 510 may be any shape known in the art, such as annular or the like. The tray 510 may be configured to be placed in a furnace. The furnace may have a shape corresponding to the tray 510. The arrangement of the plurality of cutouts 310 on the tray 510 may be based on maximizing a number of annular wear liner assemblies that can be formed from the plurality of cutouts after manufacturing. In this regard, the plurality of cutouts may be more efficiently arranged in furnaces. This may reduce costs and/or lead-time. Additionally, this may improve production capacity (i.e., the number of annular wear liner assemblies that can be produced in a single furnace run may be increased.

Figure 6:
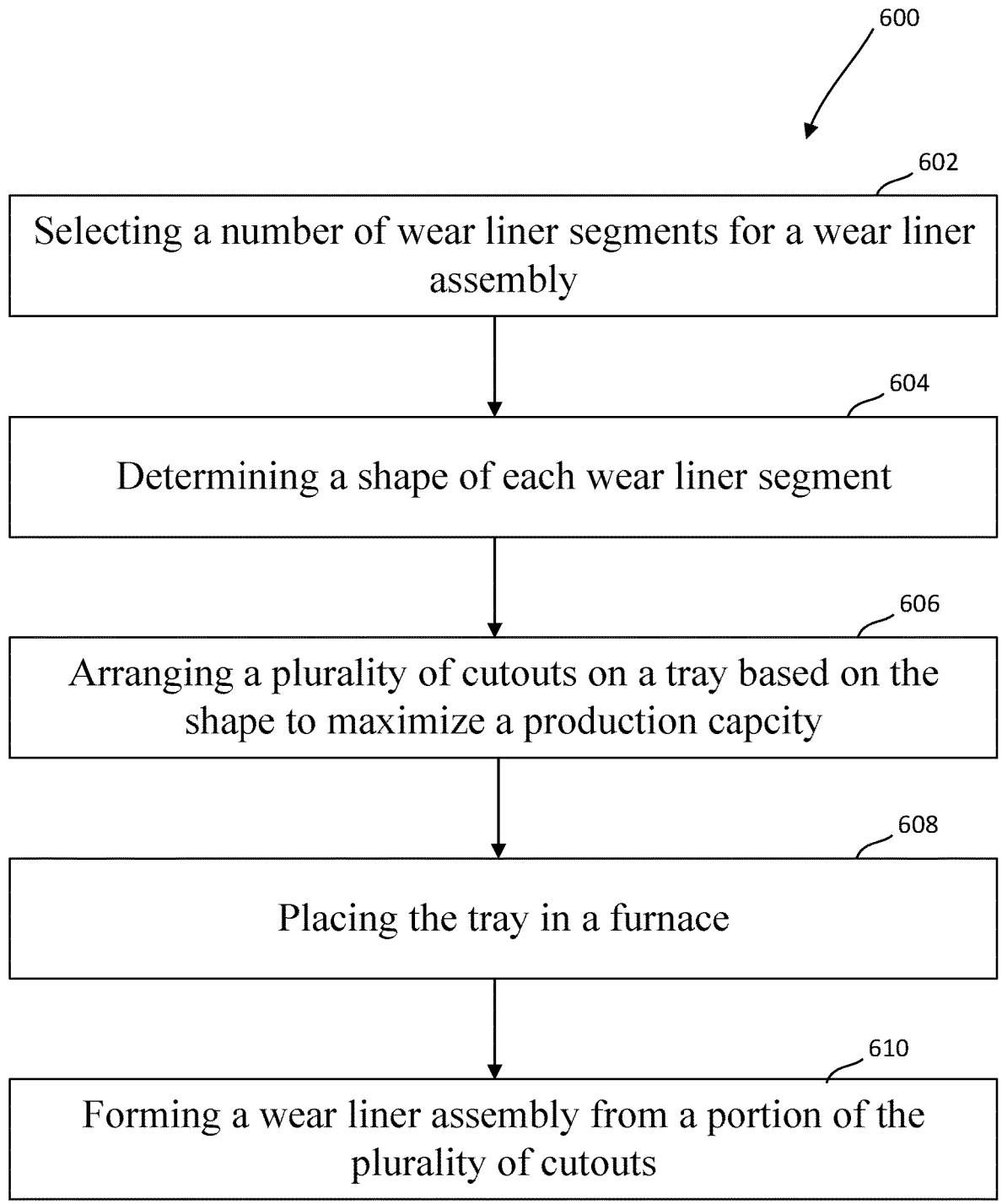
FIG. 6 illustrates a method of manufacturing a plurality of wear liner segments, in accordance with various embodiments.

Referring now to FIG. 6, a method 600 of manufacturing a plurality of wear liner segments is illustrated, in accordance with various embodiments. The method 600 may comprise selecting a number of wear liner segments for a wear liner assembly (step 602). The number of wear liner segments may be determined based on a desired production capacity of wear liner assemblies. For example, the number of wear liner segments to form a wear liner assembly having an annular shape may be increased in order to obtain a greater production capacity of the wear liner assemblies per furnace runs.

The method 600 may further comprise determining a shape of each wear liner segment based on the selected number of wear liner segments (step 604). For example, if the desired number of wear liner segments is two, the shape of each wear liner segment may be semi-annular (i.e., two wear liner segments forms an annular wear liner assembly), or if the desired number of wear liner segments is three, the shape of each wear liner segment may be arcuate with an arc angle of approximately 120 degrees (i.e., three wear liner segments forms an annular wear liner assembly).

The method 600 may further comprise arranging a plurality of cutouts on a tray for placement in a furnace in order to maximize the production capacity (step 606). In this regard, each cutout in the plurality of cutouts corresponds to a wear liner segment in the plurality of wear liner segments. Each cutout in the plurality of cutouts may be disposed adjacent to an adjacent cutout in the plurality of cutouts in any manner to maximize the production capacity. The plurality of cutouts may correspond the plurality of cutouts 310 from textile board 300 in FIG. 3. The method 600 may further comprise placing the tray in the furnace (step 608). The method 600 may further comprise forming a wear liner assembly from a portion of the plurality of cutouts (step 610). For example, if the selected number of wear liner segments is two, a first cutout in the plurality of cutouts may be coupled to a second cutout in the plurality of cutouts to form a wear liner assembly having an annular shape.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing a plurality of wear liner segments, the method comprising:
    defining a plurality of cutouts on a textile board, each cutout comprising an arcuate shape having an arc angle less than or equal to 180 degrees, the textile board comprising a carbon composite material;
    cutting the plurality of cutouts out of the textile board;
    arranging the plurality of cutouts on a tray, each cutout in the plurality of cutouts spaced apart from an adjacent cutout in the plurality of cutouts; and
    placing the tray in a furnace.

2. The method of claim 1, wherein the arc angle of each cutout is the same.

3. The method of claim 2, wherein each cutout in the plurality of cutouts corresponds to a wear liner segment for a multi-disk brake system.

4. The method of claim 3, further comprising forming a wear liner assembly from a portion of the plurality of cutouts.

5. The method of claim 4, wherein 360 degrees divided by a number of wear liner segments to form the wear liner assembly is equal to the arc angle of the arcuate shape.

6. The method of claim 1, wherein the textile board comprises a carbon composite matrix.

7. A method of manufacturing a plurality of wear liner segments, the method comprising:
    arranging a plurality of cutouts on a tray for placement in a furnace, each cutout in the plurality of cutouts including an arcuate shape having an arc angle less than or equal to 180 degrees, each cutout in the plurality of cutouts being spaced apart from an adjacent cutout in the plurality of cutouts, and each cutout in the plurality of cutouts comprising a carbon composite material; and
    placing the tray in the furnace.

8. The method of claim 7, further comprising forming a wear liner assembly from a portion of the plurality of cutouts.

9. The method of claim 8, wherein 360 degrees divided by a number of wear liner segments to form the wear liner assembly is equal to the arc angle.

10. The method of claim 7, wherein the arc angle of each wear liner segment is the same.

11. The method of claim 7, wherein each cutout in the plurality of cutouts is semi-annular in shape.

12. The method of claim 7, wherein each cutout in the plurality of cutouts comprises a carbon composite matrix.

13. The method of claim 7, wherein each cutout in the plurality of cutouts corresponds to a wear liner segment for a multi-disk brake system.

* * * * *